United States Patent
Sundrani (10) Patent No.: US 8,713,271 B2
(45) Date of Patent: Apr. 29, 2014

(54) METHODS AND SYSTEMS FOR AUTOMATED BACKUPS AND RECOVERY ON MULTI-OS PLATFORMS USING CONTROLLER-BASED SNAPSHOTS

(75) Inventor: Kapil Sundrani, Bangalore (IN)

(73) Assignee: LSI Corporation, San Jose, CA (US)

( * ) Notice: Subject to any disclaimer, the term of this patent is extended or adjusted under 35 U.S.C. 154(b) by 422 days.

(21) Appl. No.: 13/271,327

(22) Filed: Oct. 12, 2011

(65) Prior Publication Data

US 2013/0097397 A1  Apr. 18, 2013

(51) Int. Cl.
*G06F 12/16* (2006.01)
*G06F 11/14* (2006.01)
*G06F 11/20* (2006.01)

(52) U.S. Cl.
CPC ........ *G06F 11/1456* (2013.01); *G06F 11/1461* (2013.01); *G06F 11/1469* (2013.01); *G06F 11/2071* (2013.01); *G06F 11/2074* (2013.01); *G06F 2201/84* (2013.01)

USPC .................................. 711/162; 711/E21.103

(58) Field of Classification Search
None
See application file for complete search history.

(56) References Cited

U.S. PATENT DOCUMENTS

2009/0217255 A1  8/2009  Troan

*Primary Examiner* — Kevin Verbrugge
(74) *Attorney, Agent, or Firm* — Suiter Swantz pc llo (57) ABSTRACT

A method for backing up and restoring data across multiple operating systems executed by a computing product executing computer implemented instructions, wherein each operating system includes a daemon. Embodiments may include receiving a backup initiation trigger from an initial daemon on an initial operating system. This method may include relaying the backup initiation trigger to other daemons on other operating systems. This method may also include receiving snapshot requests from the other daemons, wherein each of the snapshot requests are requests for snapshots of storage associated with an operating system of one of the other operating systems. This method may further include sending received snapshot requests from the other daemons to a storage controller.

20 Claims, 6 Drawing Sheets

METHODS AND SYSTEMS FOR AUTOMATED BACKUPS AND RECOVERY ON MULTI-OS PLATFORMS USING CONTROLLER-BASED SNAPSHOTS

FIELD OF THE INVENTION

The present invention is directed generally toward a system and method of initiating synchronized data backups, rollbacks, or restorations across multiple operating systems.

BACKGROUND OF THE INVENTION

Snapshot solutions provide for backup of data as it exists at a fixed point in time. However, these solutions today are not geared for a multiple operating system environment. The problem is that in a multiple operating system environment, each operating system is unaware of the file system of other operating systems, which makes it very difficult to have a synchronized backup and recovery from a data loss scenario.

Another problem is that different operating systems do not have a common application interface for creating snapshots and taking backups. This lack of common application interface may require user intervention at every step across different operating systems. For example, on a configuration running three different guest operating systems, if a user wants to create snapshots and take backups across storage managed by individual operating systems, the user would have to login to each individual operating system, create individual snapshots on each operating system, and trigger individual backups on each operating system. Current systems provide no means to take synchronized backups across multiple and different operating systems.

Therefore, it may be desirable to provide a method and system which addresses the above-referenced current problems associated with performing automatic and synchronized data backups, rollbacks, or restorations across multiple operating systems.

SUMMARY OF THE INVENTION

Accordingly, an embodiment of the present invention is directed to a method of backing up data across multiple operating systems executed by a computing product executing computer implemented instructions, wherein each operating system includes a daemon. This embodiment may include receiving a backup initiation trigger from an initial daemon on an initial operating system. This method may include relaying the backup initiation trigger to other daemons on other operating systems. This method may also include receiving snapshot requests from the other daemons, wherein each of the snapshot requests are requests for snapshots of storage associated with an operating system of one of the other operating systems. This method may further include sending received snapshot requests, which were received from the other daemons, to a storage controller.

Another embodiment of the present invention is directed to a method of creating backup targets across multiple operating systems executed by a computing product executing computer implemented instructions, wherein each operating system includes a daemon. This embodiment may include receiving a backup target trigger from an initial daemon on an initial operating system. This embodiment may include relaying the backup target trigger to other daemons on other operating systems. This embodiment may also include receiving backup target creation requests from the other daemons and the initial daemon. This embodiment may further include sending the received backup target creation requests to a storage controller or a controller of a system-connected storage device.

A further embodiment of the present invention is directed to a method of restoring data across multiple operating systems executed by a computing product executing computer implemented instructions, wherein each operating system includes a daemon. This embodiment may include receiving a restoration initiation trigger and selected backup target information from an initial daemon on an initial operating system. This embodiment may also include relaying the restoration initiation trigger and selected backup target information to other daemons on other operating systems.

It is to be understood that both the foregoing general description and the following detailed description are exemplary and explanatory only and are not restrictive of the invention claimed. The accompanying drawings, which are incorporated in and constitute a part of the specification, illustrate embodiments of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

The present invention may include a method and system for performing synchronized backups, synchronized rollbacks, and synchronized data recovery in case of system or application failures. The present invention may further include automatic snapshot creation and backups across multiple operating systems, which may be located on different computing products connected on a network, on virtual machines of on one or more servers, or on a single computing product. A user may be able to initiate automatic snapshot creation and backups through a single computer interface action, such as activating a GUI button via a mouse-button "click." A user's or users' single computer interface action may initiate a series of application processes of an initiating application on an initiating operating system to initiate sequences of creating snapshots, triggering backups, creating backup targets, and selecting backup targets across a multiple computing product system comprising multiple operating systems. The multiple computing product system may include multiple computing products connected on a network or multiple virtual machines on one or more servers. The initiating application may include the use of internal intelligence, user or administrator preferences, storage and system storage device information, as well as other information (such as hardware configuration information, server configuration information, storage location, partition information, virtualization information, storage capacities, path mapping information, or the like) to perform sequences of creating snapshots, triggering backups, creating backup targets, and selecting backup targets across a multiple computing product system comprising multiple operating systems. In some embodiments a user associated with a particular operating system may be able to configure settings relevant to a backup of storage associated with a particular operating system by interacting with a UI of an application installed on that particular operating system. In some embodiments the application on that particular operating system may be configured such that user associated with that particular operating system may override a scheduled, triggered, or running backup.

A snapshot may be a point in time image of the data of a particular volume of storage, created at a certain point in time. A snapshot may not be directly accessible by an operating system.

A snapshot view may be a volume, which presents the data of a specific snapshot point in time. That is, a snapshot view may present data of a source volume, at the time of the creation of the relevant point in time. A snapshot view may be a mechanism of exposing a snapshot to an operating system.

A backup may be a mechanism to store a known working copy from an image of the data taken at a particular point in time.

A backup target may be the storage used to store the backup data while taking backups from a snapshot.

Embodiments of the present invention may include a controller-based backup and recovery system and method in a multiple operating system environment. Embodiments of this invention may allow for a single computer interface action to initiate a single application operating on one of multiple operating systems to begin execution of sequences of processes for creating snapshots and initiating backups on storage managed across multiple operating systems. Embodiments of the invention may also permit automatic creation of backup targets wherein backups will be triggered automatically without repeated manual intervention from a user.

It is contemplated that embodiments of the present invention, including methods 200 and 400 (described in detail below), may include applications. Applications may be configured to have user-configurable settings, including an ability to enable automatic backups across multiple operating systems. Activation of automatic backups may allow an application to automatically initiate backup target creation on storage, wherein storage may include an available set of physical disks or other storage means.

An application may further be configured to initiate creation of two or more backup targets, wherein backup targets have at least a capacity of combined snapshot views. In other embodiments, an application may be configured to allow multiple backup targets to be created, preserved, operated, and maintained in a RAID (i.e., "Redundant Array of Independent Disks") configuration.

Figure 1:
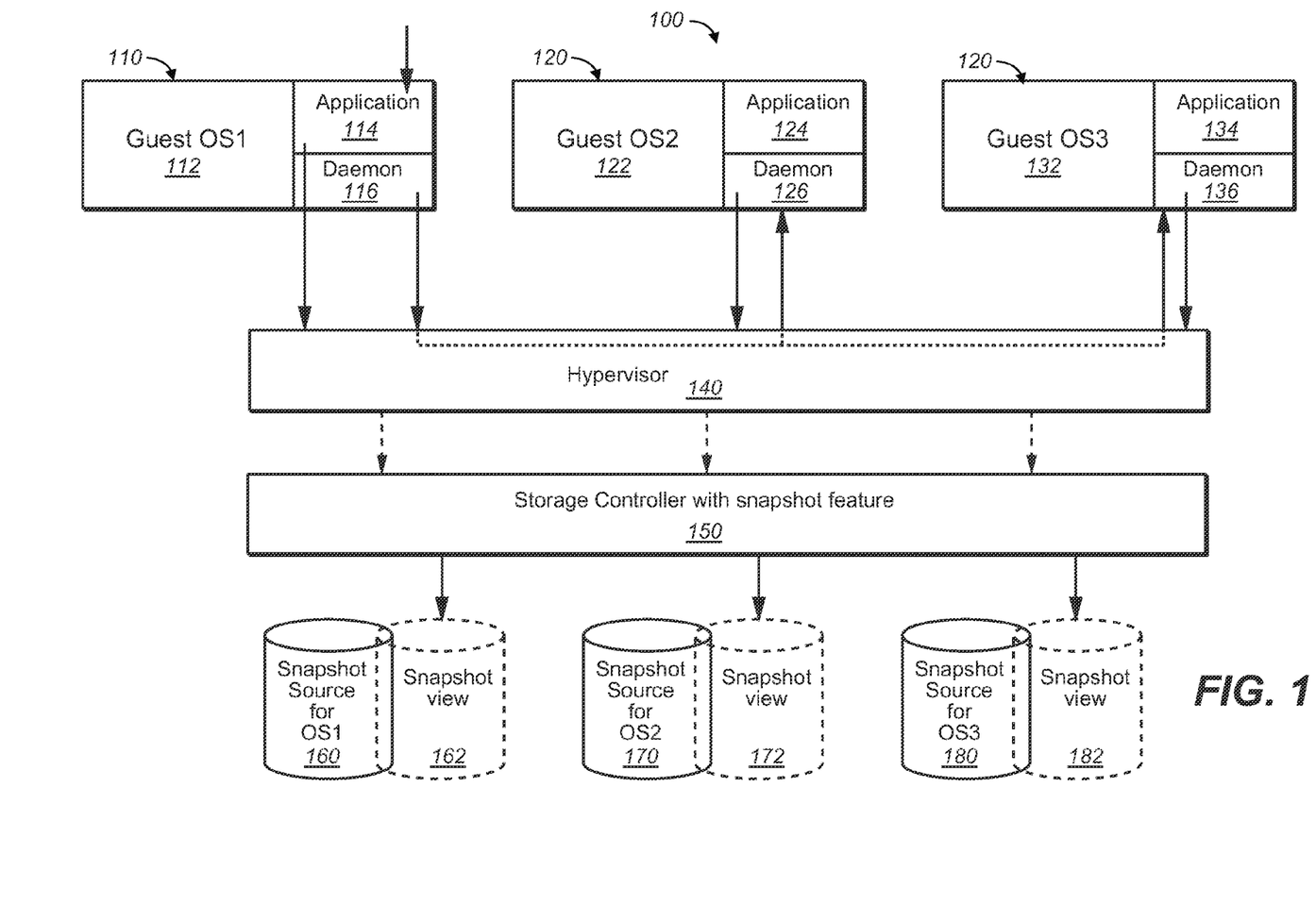
FIG. 1 shows a block diagram of a multiple computing product system suitable for implementing embodiments of the present invention.

Referring to FIG. 1, a multiple computing product system 100 includes a first computing product 110, a second computing product 120, and a third computing product 130. Each computing product 110, 120, or 130 may include a guest operating system 112, 122, or 132, wherein the guest operating system 112, 122, or 132 includes an application 114, 124, or 134 and a daemon 116, 126, or 136. In some embodiments, one or a plurality of daemons may reside on each of multiple operating systems.

Daemons (e.g., 116, 126, and 136) may be a background computer process and may operate on any operating system. Daemons may be able to respond to network requests, hardware activity, or other programs by performing some task. Unlike standard applications of an operating system, daemons may be configured to continue to perform tasks when a user is not logged in to an operating system. Daemons may also be configured to configure hardware; interact with hardware; interact with applications; interact with other daemons; send, receive, or wait for requests, triggers, or instructions from other applications or daemons; and perform a variety of other computing tasks.

It is contemplated that embodiments of the present invention may comprise a hypervisor or the use of a hypervisor. The hypervisor (e.g., 140) may be operably configured to receive triggers from and send triggers to daemons 116, 126, and 136. The hypervisor may further be operably configured to receive snapshot requests from daemons 116, 126, and 136 and applications 114, 124, and 134 and issue said snapshot requests to a storage controller 150.

in further reference to FIG. 1, the hypervisor 140 may be a virtualization hypervisor, such as VMware® ESX or ESXi. Interaction with a hypervisor 140 may be enabled such that snapshot requests received from different guest operating systems 112, 122, and 132 are sent to a storage controller 150 in a single synchronized or combined series of requests. Alternatively, hypervisor 140 may be enabled to send snapshot requests to a storage controller 150 as hypervisor 140 receives a snapshot request associated with a respective guest operating system 112, 122, or 132.

A storage controller 150 may be configured to create backup targets and create snapshots 160, 170, and 180 and snapshot views 162, 172, and 182 on controller-connected storage.

Referencing FIG. 1, for example, a user may initiate the application 114 on initiating guest operating system 112. Once the application 114 is initiated, the application 114 triggers a snapshot of storage associated with initiating guest operating system 112. Alternatively, the application 114 may trigger a daemon, such as daemon 116, to trigger the snapshot of storage associated with initiating guest operating system 112. The application 114 on initiating guest operating system 112 also triggers a daemon 116 on initiating guest operating system 112. The daemon 116 on initiating guest operating system 112 triggers through a hypervisor 140 a daemon 126 on a second guest operating system 122 and a daemon 136 on third guest operating system 132. Sending the trigger through the hypervisor 140 may include the daemon 116 on initiating guest operating system 112 sending a trigger to the hypervisor 140; then, the hypervisor 140 sends the trigger to the daemons 126 and 136 on the other guest operating systems 122 and 132. Once the daemons 126 and 136 receive these triggers, each of the daemons 126 and 136 may send requests to be received by a storage controller 150 to create respective snapshot views 162, 172, and 182 of storage associated with a respective guest operating system 112, 122, or 132. The sending of snapshot requests to a storage controller 150 may include a daemon 116, 126, or 136 sending a snapshot request to the hypervisor 140. Then, the hypervisor 140 may send the snapshot request to the storage controller 150 as it receives a snapshot request from a daemon 116, 126, or 136 of a guest operating system 112, 122, or 132; alternatively, the hypervisor 140 may wait until the hypervisor 140 receives all of the snapshot requests associated with guest operating systems 112, 122, and 132 and then send a synchronized set of snapshot requests to the storage controller 150. Upon receiving the snapshot requests, the storage controller 150 creates snapshots views 162, 172, and 182 of the snapshot sources 160, 170, and 180 of guest operating systems 112, 122, and 132.

Figure 2:
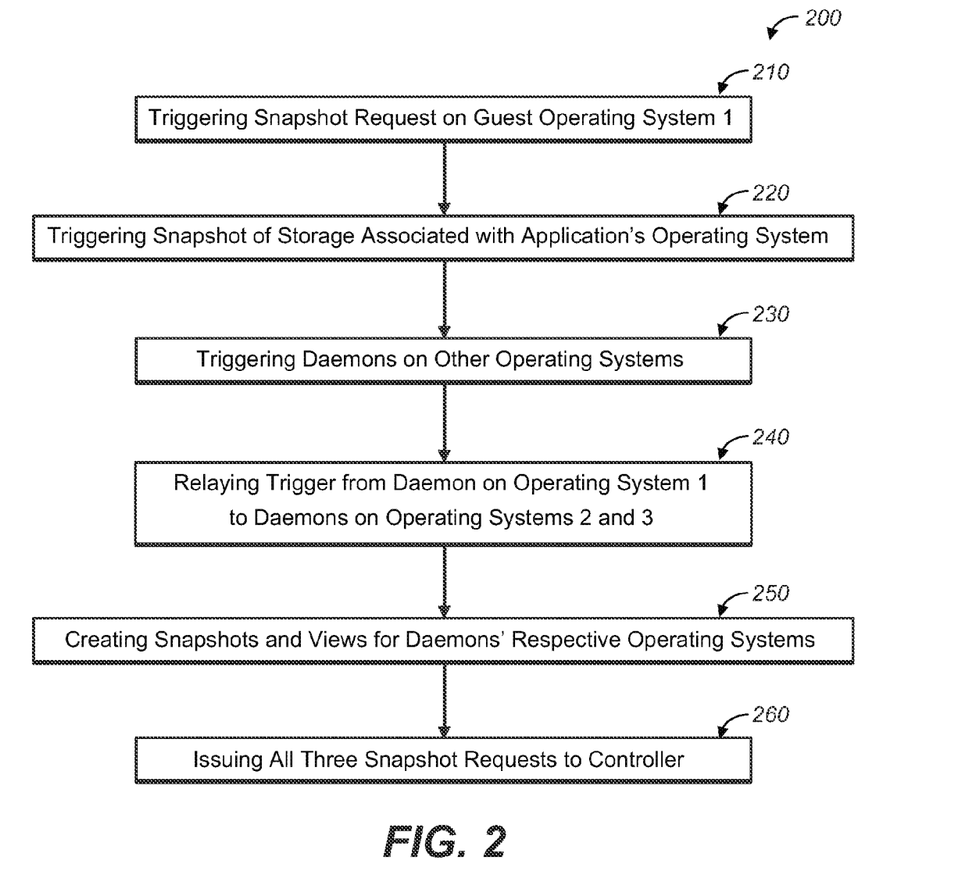
FIG. 2 shows a flow chart of a method associated with synchronizing snapshot and snapshot view requests across multiple operating systems.

Referring to FIG. 2, some embodiments of the present invention may include a method 200. It is contemplated that embodiments of method 200 may be executed by a hypervisor (e.g., 140). As shown in FIGS. 1 and 2, method 200 may include synchronizing snapshot and snapshot view requests across multiple operating systems. Step 210 of method 200 may include a user triggering a snapshot request on an operating system (e.g. guest operating system 1, 112) by interfacing with a GUI of an initiating application (e.g., 114) to initiate a snapshot request across multiple operating systems (e.g., 112, 122, and 132). Step 220 of method 200 may include an initiating application (e.g., 114) triggering a snapshot request for storage (e.g., 160) associated with the initiating application's operating system (e.g., 112). Step 220 may also include an application (e.g., 114) triggering a daemon (e.g., 116) on the initiating application's operating system (e.g., 114). Step 230 of method 200 may include a daemon (e.g., 116) on the initiating application's operating system (e.g., 112) triggering daemons (e.g., 126 and 136) on other operating systems (e.g., 122 and 132) via a hypervisor (e.g., 140). Step 240 of method 200 may include a hypervisor (e.g., 140) relaying a trigger from a daemon (e.g., 116) on the initiating application's operating system (e.g., 112) to daemons (e.g., 126 and 136) on other operating systems (e.g., 122 and 132). Step 240 may include the hypervisor (e.g., 140) receiving a trigger communication from a daemon (e.g., 116) on the initiating application's operating system (e.g., 112) and a hypervisor (e.g., 140) sending the trigger communication to daemons (e.g., 126 and 136) on other operating systems (e.g., 122 and 132). Step 250 of method 200 may include daemons (e.g., 126 and 136) creating snapshots and views for daemons' respective operating systems (e.g., 122 and 132). Step 250 may include daemons (e.g., 126 and 136) sending requests for snapshots and snapshot views to a storage controller (e.g., 150) through a hypervisor (e.g., 140). Step 250 may include daemons (e.g., 116, 126, and 136) sending a snapshot request to a hypervisor (e.g., 140). In step 260 a hypervisor (e.g., 140) may in turn issue snapshot requests to a storage controller (e.g., 150). Upon receiving snapshot requests, storage controller (e.g., 150) may create snapshot views (e.g., 162, 172, and 182) of the snapshot sources (e.g., 160, 170, and 180) associated with each of multiple operating systems (e.g., 112, 122, and 132).

Figure 3:
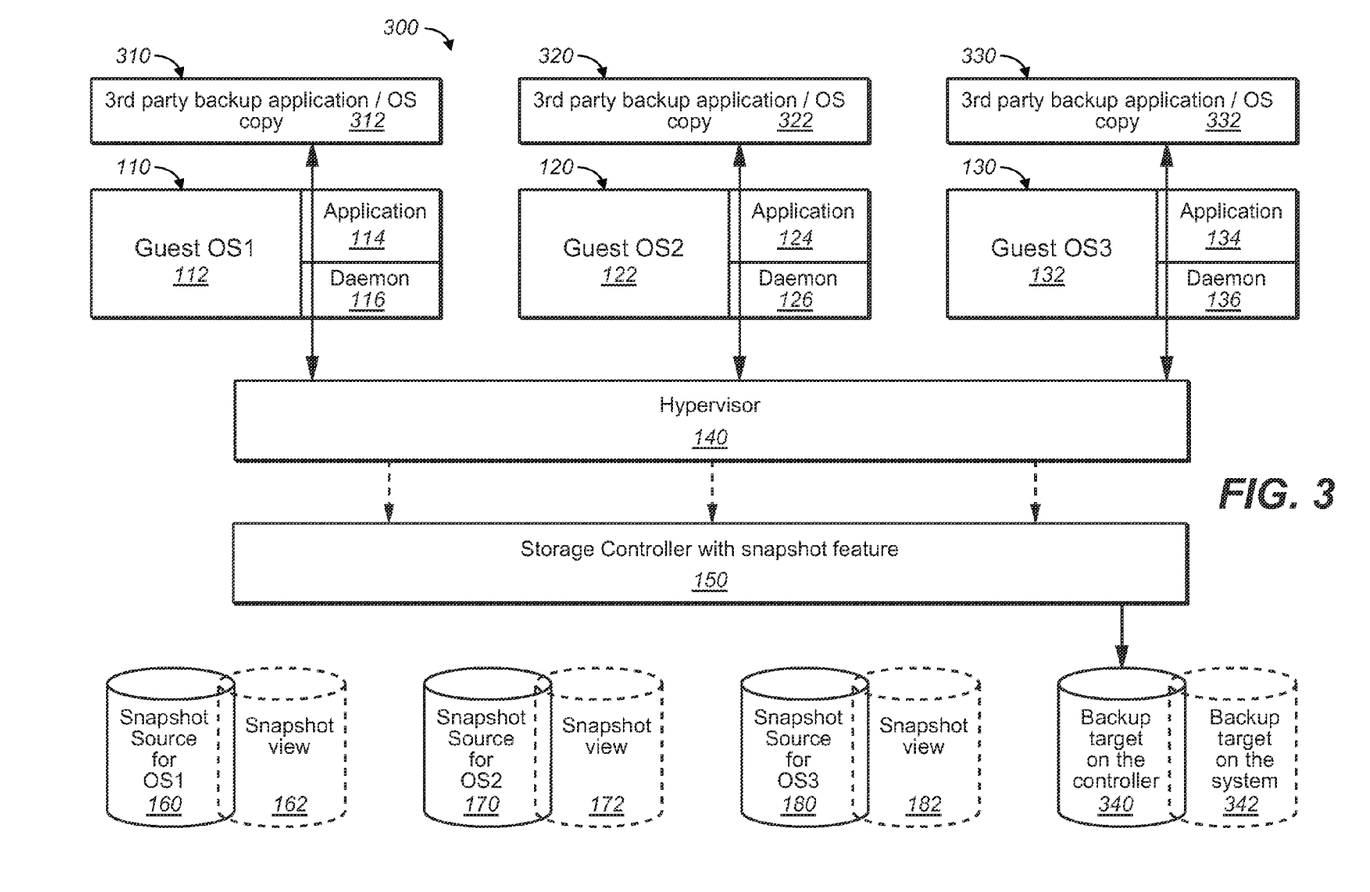
FIG. 3 shows a block diagram of a multiple computing product system suitable for implementing some embodiments of the present invention.

Referring to FIG. 3, in some embodiments daemons 116, 126, 136 on guest operating systems 112, 122, 132 may trigger the creation of a backup target on storage controlled by the storage controller 150 or on a storage device, such as a backup tape device, external storage device, or the like, connected to multiple computing product system 100. Daemons 116, 126, 136 may send backup target creation requests to hypervisor 140. Hypervisor 140 may then issue backup target creation requests to storage controller 150 to create controller backup target 340. Alternatively, hypervisor 140 may issue backup target creation requests to a controller of a storage device, such as a backup tape device, external storage device, or the like, connected to multiple computing product system 100 to create a system backup target 342. Storage controller 150 may then create controller backup target 340. Alternatively, a system storage device controller may create system backup target 342.

In further reference to FIG. 3, once a backup target is created, a daemon 116, 126, 136 may initiate an automated backup to be performed through a third-party backup application 310, 320, 330 or an operating system provided copy application 312, 322, 332. If a third-party backup application 310, 320, 330 is used, daemon 116, 126, 136 may initiate a third-party backup application 310, 320, 330, accessible by daemon's corresponding operating system 112, 122, 132, to copy a snapshot view 162, 172, and 182 of a corresponding snapshot source 160, 170, 180 to a controller backup target 340 or a system backup target 342. If an operating system provided copy application 312, 322, 332 is used, daemon 116, 126, 136 may initiate an operating system provided copy application 312, 322, 332 accessible by daemon's corresponding operating system 112, 122, 132 to copy data to a controller backup target 340 or a system backup target 342. Third-party backup application 310, 320, 330 or an operating system provided copy application 312, 322, 332 may perform an automated backup by then copying snapshot views 162, 172, and 182 to either controller backup target 340 or system backup target 342.

Figure 4:
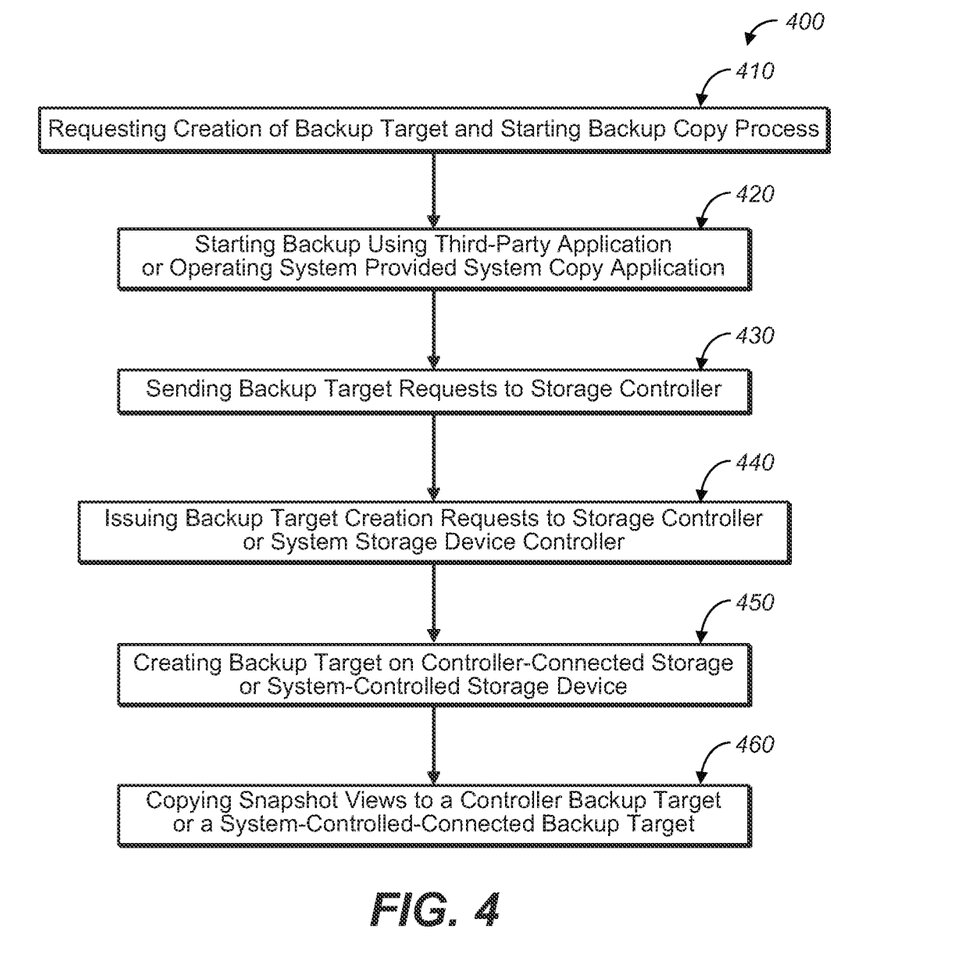
FIG. 4 shows a flow chart of a method associated with synchronizing backups across multiple operating systems.

In reference to FIG. 4, some embodiments of the present invention may include a method 400. Method 400 may include synchronizing backups across multiple operating systems of a multiple computing product system. Step 410 of method 400 may include daemons (e.g., 116, 126, and 136) requesting creation of a backup target (e.g., 340 or 342), if backup target (e.g., 340 or 342) does not already exist and backup target allocation properties do need to be updated. Step 410 may also include daemons (e.g., 116, 126, and 136) initiating a backup copy process. Step 420 of method 400 may include daemons (e.g., 116, 126, and 136) starting backup copy process by initiating a third-party application (e.g., 310, 320, 330) or an operating system provided copy application (e.g., 312, 322, 332). Step 430 may include daemons (e.g., 116, 126, and 136) sending backup target requests to a storage controller (e.g., 150) via a hypervisor (e.g., 140). Step 440 may include a hypervisor (e.g., 140) issuing backup target creation requests to a storage controller (e.g., 150) or a system storage device controller. Step 450 may include a storage controller (e.g., 150) creating a backup target (e.g., 340) on controller-connected storage (e.g., 340) or a system-controlled storage device (e.g., 342). Step 460 may include copying snapshot views to a controller backup target (e.g., 340) or a system-controlled backup target (e.g., 342).

Figure 5:
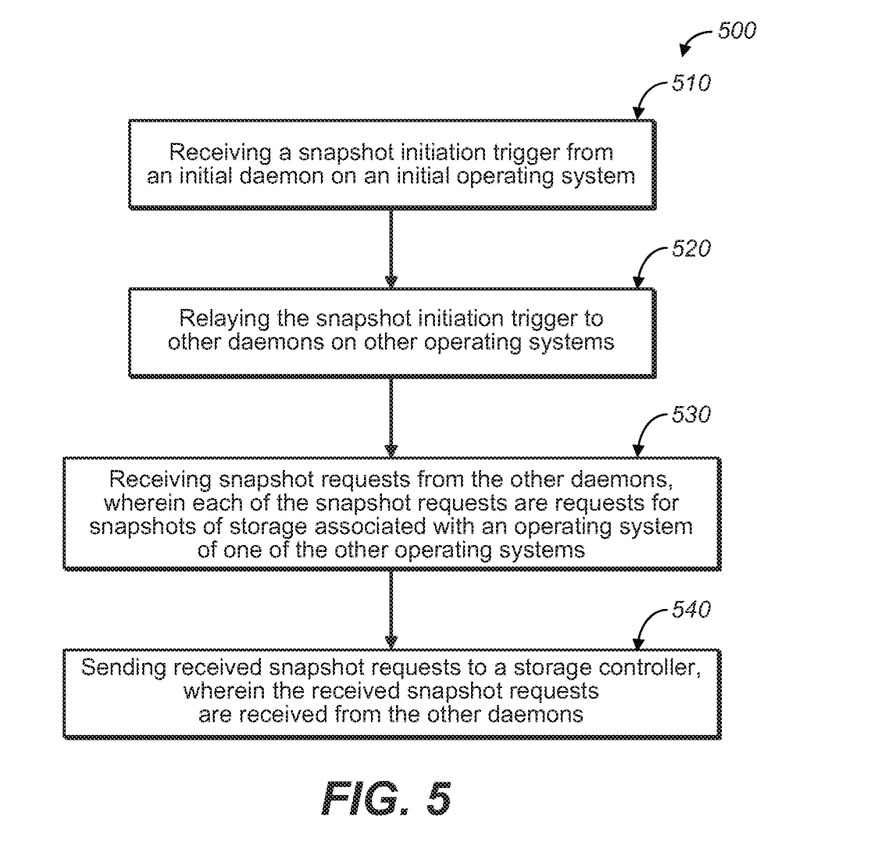
FIG. 5 shows a flow chart of a method associated with synchronizing backups and snapshot creations across multiple operating systems.

In reference to FIG. 5, some embodiments of the present invention may include a method 500. Method 500 may include synchronizing backups or snapshot creation across multiple operating systems of a multiple computing product system. Step 510 may include receiving a snapshot initiation trigger from an initial daemon on an initial operating system. Step 520 may include relaying the snapshot initiation trigger to other daemons on other operating systems. Step 530 may include receiving snapshot requests from the other daemons, wherein each of the snapshot requests are requests for snapshots of storage associated with an operating system of one of the other operating systems. Step 540 may include sending received snapshot requests to a storage controller, wherein the received snapshot requests are received from the other daemons.

Figure 6:
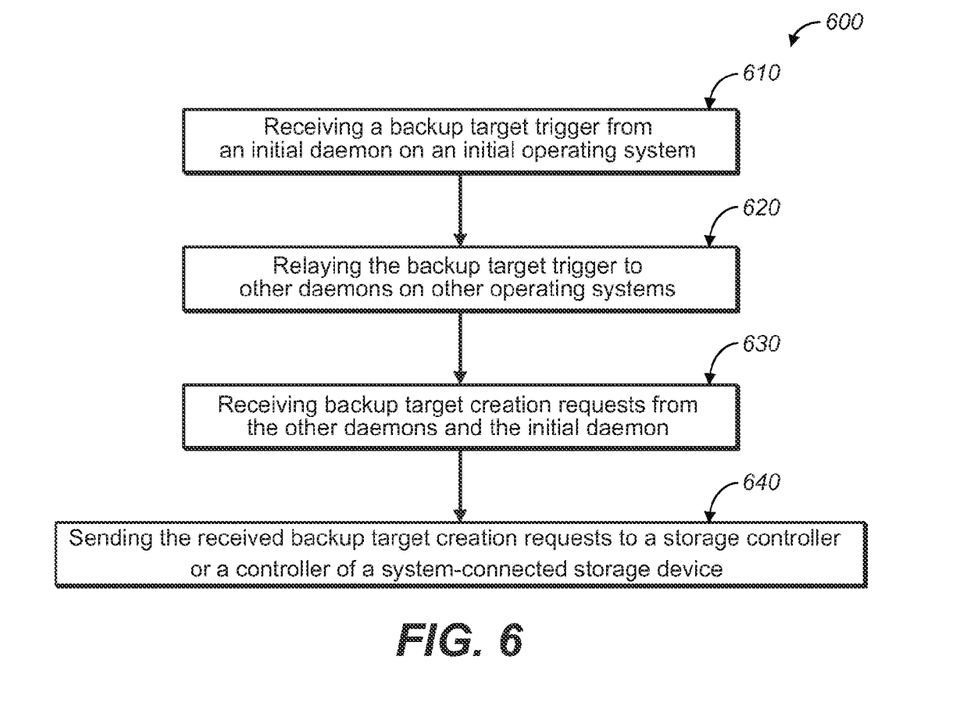
FIG. 6 shows a flow chart of a method associated with synchronizing backups and backup target creation across multiple operating system.

In reference to FIG. 6, some embodiments of the present invention may include a method 600. Method 600 may include synchronizing backup target creation across multiple operating systems of a multiple computing product system. Step 610 may include receiving a backup target trigger from an initial daemon on an initial operating system. Step 620 may include relaying the backup target trigger to other daemons on other operating systems. Step 630 may include receiving backup target creation requests from the other daemons and the initial daemon. Step 640 may include sending the received backup target creation requests to a storage controller or a controller of a system-connected storage device.

Figure 7:
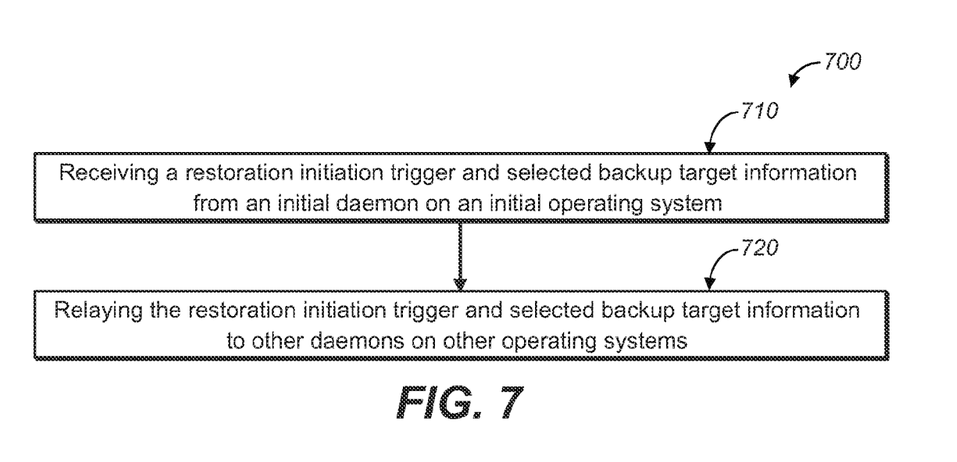
FIG. 7 shows a flow chart of a method associated with synchronizing backups and restorations across multiple operating systems.

In reference to FIG. 7, some embodiments of the present invention may include a method 700. Method 700 may include synchronizing restorations across multiple operating systems of a multiple computing product system. Step 710 may include receiving a restoration initiation trigger and selected backup target information from an initial daemon on an initial operating system. Step 720 may include relaying the restoration initiation trigger and selected backup target information to other daemons on other operating systems.

A user or other process may schedule to initiate, define initiation triggering events to initiate, or manually initiate any of the applications 114, 124, or 134 on any of the guest operating systems 112, 122, or 132 to synchronize backups, roll backs, or data recovery across multiple operating systems 112, 122, and 132 of multiple computing products 110, 120, and 130. A user may also pause, abort, resume, retry, or cancel a backup, snapshot creation, restoration, or roll back process associated with one operating system or across any number of operating systems by sending a interruption trigger to a hypervisor which may then send a communication to a storage controller with directions from the interruption trigger.

Additionally, a user or other process may configure settings for backups, snapshot creations, restorations, or roll backs on a particular operating system and synchronize settings across multiple operating systems. An application or daemon may then send the settings for backups, snapshot creations, restorations, or roll backs to a hypervisor, and the hypervisor may relay the settings for backups, snapshot creations, restorations, or roll backs to daemons on other operating systems.

It is contemplated that embodiments of the invention, including methods 200 and 400, may include an application configured to set backup target location and backup target size automatically or manually. The application may automatically determine an acceptable size and storage to allocate for a backup target; alternatively, a user may customize such configurable settings. Additionally, the application on an initial operating system may communicate and coordinate with applications on other operating systems by using daemons communicating over a hypervisor so that backup target location and size is coordinated and physically allocatable. That is, the application may trigger one or more daemons on an initial operating system. The one or more daemons on the initial operating system may trigger daemons on other operating systems by communicating via a hypervisor; daemons on other operating systems may in turn trigger applications running on said other operating systems. Applications on said other operating systems may then determine the amount of size required for a selected, scheduled, or performed snapshot views associated with application's operating system. Applications on the other operating systems may then trigger daemons to report back to a daemon on the initiating operating system. This daemon on the initiating operating system may then report to the initiating operating system application the amount of storage needed by each snapshot of the multiple other operating systems. The initiating application can then allocate a suitable backup target size and storage.

In some contemplated embodiments of the invention, applications 114, 124, 134 may further be configured to allow for synchronized data restoration across multiple operating systems 112, 122, and 132. For example, a user may initiate a restoration of a backup copy through an application 114, 124, or 134. Application 114, 124, or 134 may prompt a user to select from available backup copies presently stored in one or more backup targets, such as backup targets 340 and 342. Application 114, 124, or 134 of corresponding operating system 112, 122, or 132 may then initiate a data restoration of selected backup copy on backup target 340 or 342 by triggering daemon 116, 126, or 136 of said corresponding operating system 112, 122, or 132. Daemon 116, 126, or 136 may then trigger through hypervisor 140 daemons on other operating systems. Daemons on each of multiple operating systems may then initiate a backup restore through a third-party application or through an operating system provided copy application.

In some embodiments, an application may be configured to initiate creation of a first backup target and a second backup target wherein third-party backup application or operating system copy application may copy snapshot views of snapshot sources on first backup target during performance of a first backup. During a subsequent second backup, snapshot views of snapshot sources may be copied to second backup target. During a third backup and subsequent oddly numbered backups, snapshot views of snapshot sources may be copied to first backup target and in the process may overwrite backup data corresponding to a previous oddly numbered backup. Likewise, during a fourth backup and subsequent evenly numbered backups, snapshot views of snapshot sources may be copied to the second backup target and in the process may overwrite backup data corresponding to a previous evenly numbered backup. Such a system of using alternating first and second backup target may provide efficient storage space management.

A system of using alternating first and second backup targets ensures that one prior consistent backup target exists even during execution of a backup process. Also, an alternating first and second backup target configuration ensures that one prior consistent backup target exists in case a computer or data system had a failure-type event during execution of a backup process or in case a backup target became corrupted. Also, having a prior consistent backup target allows a system to be rolled back to a prior stable state, such as might be the situation if a data or computer system became infected by a virus.

In some embodiments, a RAID system may be used so that backup targets may be configured with redundancy to provide a higher certainty of data preservation in case of a disaster, data storage system failure, or the like. Because it is contemplated that users' desired levels of redundancy may span a vast spectrum from no desired redundancy to the highest level of redundancy, an application (e.g., 114, 124, or 134) may include settings to allow a user to adjustably change and define backup target settings, including locations, and backup data redundancy settings. An application may further be configured to allow a user to set backup targets on storage behind a storage controller or on system-connected storage, such as a tape disk.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of backing up data across multiple operating systems executed by a computing product executing computer implemented instructions, wherein each operating system includes a daemon, comprising:
   receiving a snapshot initiation trigger from an initial daemon on an initial operating system;
   relaying the snapshot initiation trigger to other daemons on other operating systems;
   receiving snapshot requests from the other daemons, wherein each of the snapshot requests are requests for snapshots of storage associated with an operating system of one of the other operating systems; and
   sending received snapshot requests to a storage controller, wherein the received snapshot requests are received from the other daemons.

2. The method of claim 1, further including:
   receiving a snapshot request from an initial application on the initial operating system.

3. The method of claim 1, further including:
   receiving a snapshot request from the initial daemon on the initial operating system.

4. The method of claim 1, further including:
   sending received snapshot requests from the other daemons to a storage controller at substantially a same time.

5. The method of claim 1, further including:
   receiving an interruption trigger from an interrupting daemon; and
   sending to the storage controller directions to pause, abort, resume, retry, or cancel, a backup, snapshot creation, restoration, or roll back, wherein the directions sent to the storage controller are based upon information from the interruption trigger.

6. The method of claim 1, further including:
   receiving a backup target trigger from an initial daemon on an initial operating system; and
   relaying the backup target trigger to other daemons on other operating systems.

7. The method of claim 1, further including:
   receiving backup target creation requests from the other daemons and the initial daemon; and
   sending the received backup target creation requests to a storage controller or a controller of a system-connected storage device.

8. A method of creating backup targets across multiple operating systems executed by a computing product executing computer implemented instructions, wherein each operating system includes a daemon, comprising:
   receiving a backup target trigger from an initial daemon on an initial operating system;
   relaying the backup target trigger to other daemons on other operating systems;
   receiving backup target creation requests from the other daemons and the initial daemon; and
   sending the received backup target creation requests to a storage controller or a controller of a system-connected storage device.

9. The method of claim 8, further including:
   receiving a backup initiation trigger.

10. The method of claim 9, further including:
    relaying a backup initiation trigger to the other daemons on the other operating systems.

11. The method of claim 8, further including:
    receiving snapshot requests, wherein each of the snapshot requests are requests for snapshots of storage associated with an operating system of the other operating systems.

12. The method of claim 11, further including:
    sending the received snapshot requests to a storage controller at substantially a same time.

13. The method of claim 8, further including:
    receiving an interruption trigger from an interrupting daemon; and
    sending to the storage controller directions to pause, abort, resume, retry, or cancel a backup, snapshot creation, restoration, or roll back associated with the multiple operating systems, wherein the directions sent to the storage controller are based upon information from the interruption trigger.

14. A method of restoring data across multiple operating systems executed by a computing product executing computer implemented instructions, wherein each operating system includes a daemon, comprising:
    receiving a restoration initiation trigger and selected backup target information from an initial daemon on an initial operating system; and
    relaying the restoration initiation trigger and selected backup target information to other daemons on other operating systems.

15. The method of claim 14, further including:
    receiving a backup initiation trigger.

16. The method of claim 15, further including:
    relaying a backup initiation trigger to the other daemons on the other operating systems.

17. The method of claim 14, further including:
    receiving snapshot requests from the other daemons, wherein each of the snapshot requests are requests for snapshots of storage associated with an operating system of the other operating systems.

18. The method of claim 17, further including:
    sending the received snapshot requests to a storage controller at substantially a same time.

19. The method of claim 14, further including:
    receiving backup target creation requests from the other daemons and the initial daemon; and
    sending the received backup target creation requests to a storage controller or a controller of a system-connected storage device.

20. The method of claim 14, further including:
    receiving an interruption trigger from an interrupting daemon; and
    sending to the storage controller directions to pause, abort, resume, retry, or cancel a backup, snapshot creation, restoration, or roll back associated with the multiple operating systems, wherein the directions sent to the storage controller are based upon information from the interruption trigger.

* * * * *